United States Patent

[11] 3,627,425

[72] Inventors Barrett Doyle
New Brighton;
Helmut M. Volk, St. Paul, both of Minn.
[21] Appl. No. 824,549
[22] Filed May 14, 1969
[45] Patented Dec. 14, 1971
[73] Assignee Honeywell Inc.
Minneapolis, Minn.

[54] LASER GYROSCOPE BIASING APPARATUS
5 Claims, 1 Drawing Fig.
[52] U.S. Cl. .................................................... 356/106
[51] Int. Cl. ..................................................... G01b 9/02, G01b 9/10
[50] Field of Search............................................. 356/106, 106 RL

[56] References Cited
UNITED STATES PATENTS

| | | | |
|---|---|---|---|
| 3,373,650 | 3/1968 | Killpatrick.................. | 331/94.5 |
| 3,392,622 | 7/1968 | Senf............................. | 356/106 RL |
| 3,395,270 | 7/1968 | Speller........................ | 356/106 RL |
| 3,462,708 | 8/1969 | McClure..................... | 356/106 RL |
| 3,468,608 | 9/1969 | Doyle.......................... | 356/106 RL |
| 3,469,922 | 9/1969 | Coccoli et al............... | 356/106 RL |
| 3,471,804 | 10/1969 | Bridges et al............... | 356/106 RL |

*Primary Examiner*—Ronald L. Wibert
*Assistant Examiner*—J. Rothenberg
*Attorneys*—Charles J. Ungemach, Ronald T. Reiling and Bruce C. Lutz

ABSTRACT: Electronic apparatus processes the output of a laser gyroscope which is operated with a large amplitude oscillatory bias, to obtain the output after an integer number of bias cycles.

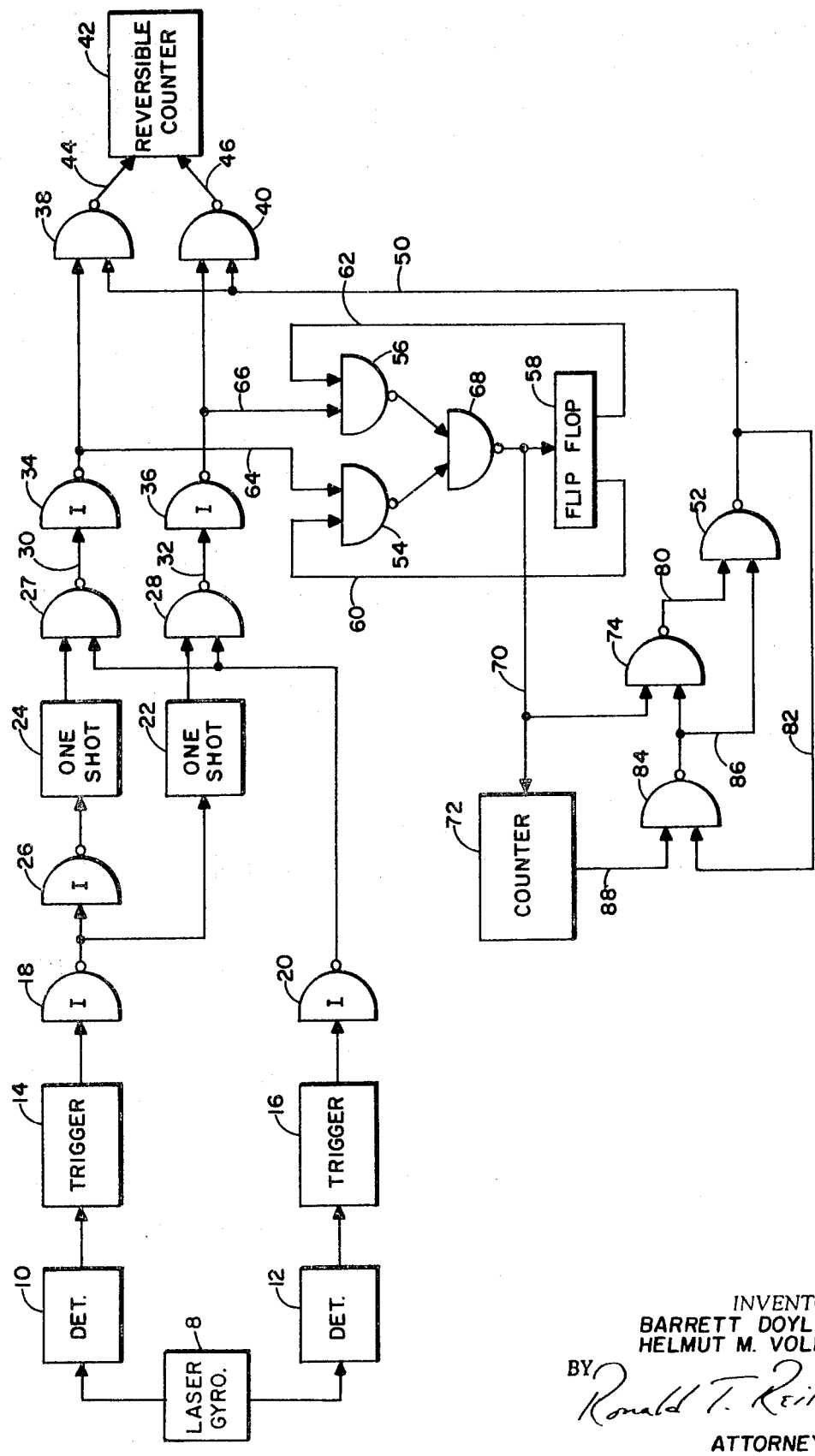

LASER GYROSCOPE BIASING APPARATUS

BACKGROUND OF THE INVENTION

It is well known in the prior art that laser gyroscopes cannot measure slow rotational rates when the difference in frequency between the two counterrotating light beams is small. The reason for this is that the two beams tend to resonate together or "lock-in" so that both beams oscillate at the same frequency. One prior art solution to this problem is shown by the J. E. Killpatrick Pat. No. 3,373,650 assigned to the present assignee. Killpatrick rapidly rotates the gyro back and forth so that most of the time the gyro is rotating at a speed above the lock-in rate. For applications in which the gyroscope input axis can be fixed in direction, reduced errors are obtained by the use of another prior art solution as shown in the patent application of Barrett Doyle Ser. No. 816,866 also assigned to the present assignee. Doyle utilizes a "slow basis" in which the gyro is rotated through a larger angle and reverses direction less often. Since the output of this type of gyroscope is digital in nature, electronic counters keep track of the angle through which the gyro has turned. However, most of this angle is due to the back and forth rotation utilized to bias the gyroscope above the lock-in rate. True input rotation is obtained only after an integer number of bias cycles. It is necessary, therefore, to electronically start and stop the counter at turning points of the bias cycle. The present invention provides apparatus to achieve this result.

SUMMARY OF THE INVENTION

Briefly, the output of a laser gyroscope comprises two monochromatic light beams whose frequencies differ by an amount proportional to the rate of rotation of the gyroscope. If the two output beams are combined to form a fringe pattern such as shown in the above-referenced Killpatrick patent, an optical detector may be positioned to view this fringe pattern and produce a sine wave of frequency proportional to the rotational rate of the gyroscope. If two detectors are correctly positioned, two sine waves 90° out of phase are obtained and their relative phase lead or lag is an indication of the direction in which the laser gyroscope is rotating. Electronic circuitry is provided to pass pulses on one line if the gyro is turning in a first direction and a second line if the gyro is turning in a second direction. In the present invention, additional electronic circuitry senses a change of signal from one line to the other and triggers a flip-flop circuit so as to indicate this change. An electronic counter keeps track of the number of times the change takes place and operates therefrom to open and close electronic gates allowing the signal to pass to the counters during an integral number of cycles of back and forth bias rotation. Thus, the output of the system includes no net rotational angle as a result of the back and forth bias. Consequently, it is an object of the present invention to provide an improved laser gyroscope biasing device. A further object of our invention is to provide circuitry to isolate the output of a laser gyroscope as a result of the bias from the output of the laser gyroscope as a result of measured rotation. Other objects and advantages will become apparent to those skilled in the art upon consideration of the following description and drawing.

BRIEF DESCRIPTION OF THE DRAWING

The drawing shows schematically a circuit diagram of the major components in a preferred embodiment of our invention.

DESCRIPTION OF THE PREFERRED EMBODIMENT

In the drawing a laser gyroscope 8 produces a fringe pattern which is monitored by a pair of detectors 10 and 12 in the manner described in the above-referenced Killpatrick patent. As mentioned above, the detectors are spaced properly in the fringe pattern so as to produce sine wave signals 90° out of phase. The signals from detectors 10 and 12 pass through a pair of trigger circuits 14 and 16 respectively. Trigger circuits 14 and 16 generate square waves of the same phase and frequency as the signals produced by the detectors. The square wave signals are inverted and buffered by a pair of inverters 18 and 20. The signal from inverter 18 is then presented to a one shot circuit 22 directly and to a one shot circuit 24 after being inverted by an inverter 26. Each one shot circuit is triggered ON for a predetermined short interval of time each time its input receives a negative-going signal, that is, on transitions from 1 to 0 at the outputs of the inverters 18 and 26. The input of one shot 24 is 180° out of phase from one shot 22 because of inverter 26. For this reason, only one of the one shot circuits will be ON at the same time as the square wave from trigger 16.

The signals from one shot 24, one shot 22, and trigger 16 are presented to a pair of NAND-gates 27 and 28. A NAND-gate has the characteristic of always producing an output signal (1) unless an input signal (1) is being received on each input. Thus, if one shot 22 happens to be turning ON (1) during the time that the square wave from trigger 16 is on (1), NAND-gate 28 will produce a negative output pulse signal (0) for each pulse front one shot 22.

Since detectors 10 and 12 are spaced 90° apart in the fringe pattern, if the fringe pattern from the laser gyroscope changes direction indicating a change in the direction of rotation of the laser gyroscope, the detector signal that was 90° behind becomes 90° ahead. As a result, one shot 24 will now be in phase with trigger 16 and therefore NAND-gate 28 will stop producing a signal whereas the signal from one shot 24 will pass through NAND-gate 27. Thus, if the gyroscope is rotating in one direction, a signal is present on line 30, and if it is rotating in the other direction, a signal is present on line 32. The function of the remaining circuit, which is the subject of the present application, is to start the count upon one reversal of the bias cycle, and to stop the count after a predetermined integer number of bias cycles. The transmission of pulses to the counter is controlled by output-gates 38 and 40. These gates in turn are actuated by the logic circuits. The logic circuits comprise a sign change detector, a bias cycle counter, and an electronic latch. The sign change detector produces a single pulse whenever signal pulses transfer from line 30 to line 32, or vice versa, which signifies a change of the direction of rotation of the gyroscope. The counter receives these sign change pulses and registers the number of half cycles of bias rotation. The latch controls the state of the output gates. It is turned ON by a first sign change pulse, and is turned OFF by an output pulse from the counter. After a predetermined integer number of bias cycles, the counter resets the latch to stop the transmission of pulses through the output-gates 38 and 40 to the counter. Additional circuits may be provided to permit manual reset of the counter and latch. A more detailed description of the operation of the circuits follows.

The negative pulse signals on line 30 and 32 are inverted and buffered by a pair of inverters 34 and 36 and presented to output-gates 38 and 40. The signals from gates 38 and 40 are presented to a reversible counter 42. The number of output pulses received is an indication of the amount of rotation of the laser gyroscope. If the pulses are on line 30, reversible counter 42 receives the pulses on line 44 and counts in one direction. If the laser gyroscope rotates the other direction, the pulses are received through line 32 and line 46 and reversible counter 42 reverses and counts in the other direction. Since the gyro is slowly being rotated back and forth for biasing purposes, the reversible counter shows a continuous up and down counting mode.

In order to measure overall rotation of the gyroscope, it is necessary to pass the output signals to reversible counter 42 only during the interval of time in which an integer number of back and forth bias cycles occur. Consequently, circuitry is provided for opening and closing gates 38 and 40 only at the beginning and end of an integer number of bias cycles.

All of the gate circuits shown in the drawing are standard NAND gates, which, as described earlier, produce a "1" output voltage level unless both of the inputs have a signal present in which case they go to zero. To start in an "off" condition, gates 38 and 40 must be off, which means that there is no signal present on line 50. Thus, whenever pulses are received from inverters 34 and 36, there is only a "1" output voltage from NAND-gates 38 and 40 and the pulses do not pass through to reversible counter 42. The zero signal on line 50 is provided by a NAND-gate 52 which opens precisely at the beginning of a bias rotation and closes again at the end of an even number of cycles of bias rotation. The circuitry to open and close NAND-gate 52 is described below.

A bias rotation cycle begins when the laser gyroscope stops rotating in one direction and begins rotating in the other direction. Up to this point in time, there have been a series of pulses representative of the angle traversed by the laser gyroscope on either line 30 or line 32. As the gyroscope reverses its direction of rotation, the pulses cease on the line where they previously existed and jump to the other line. The effect of the change in the direction of rotation is sensed by transmitting the signals on the two lines to two separate NAND-gates 54 and 56.

NAND-gates 54 and 56 are controlled by flip-flop 58 which responds to each input signal on line 70 in such a manner as to apply a signal alternately to either line 60 or line 62. If, for example, pulses are received on line 64 and an ON signal is present on line 60, the first pulse received on line 64 passes through NAND-gate 54 to NAND-gate 68. Since the flip-flop is delivering an "ON" signal to line 60 it is delivering an OFF signal to line 62 and therefore the output of NAND-gate 56 is an ON condition. Thus, gate 68 receives signals on both inputs and passes the first pulse to flip-flop 58 causing it to transfer its "on" condition signal to line 62. This will turn off gate 54 and turn on gate 56 which prevents any further pulses from passing through from line 64. This one pulse passed to flip-flop 58 will also travel down line 70 to counter 72 and NAND-gate 74. The next time the laser gyroscope reverses direction, pulses begin to flow in line 66. Since gate 56 is now open, the first pulse in line 66 will pass through gate 56 and gate 68 to flip-flop 58 in the same manner as described before so as to flip the "on" signal to NAND-gate 54 and prevent further pulses from passing from line 66. In other words, a pulse is present on line 70 each and every time the gyroscope changes direction but at no other times. Since there is normally an OFF condition on line 70 it can be seen that NAND-gate 74 will generate a steady "on" voltage condition on line 80 to NAND-gate 52. As already described, the signal on line 50 is zero and this is fed back by means of line 82 to NAND-gate 84. Since one of the inputs to NAND-gate 84 is zero NAND-gate 84 is "on" and a voltage is fed to line 86. Thus, since an "on" signal is supplied to both NAND-gate 74 and 52, as soon as a pulse is received on line 70 indicating the sign change, gate 74 is caused to generate a pulse on line 80 to gate 52 causing line 50 to receive an "on" signal which opens gates 38 and 40. Counter 72 is designed to normally produce an "on" signal on line 88, so that the "on" signal on line 82 causes gate 84 to turn off and produce a zero signal on line 86, thus, maintaining the "on" condition of gate 52.

Counter 72 is an ordinary electronic counter which receives each of the sign change pulses from line 70. Counter 72 may be constructed according to principles well known to those skilled in the art of building binary electronic counters and is designed to count the desired number of cycles of rotation of the gyroscope. As soon as the required number of cycles have been counted out, the next sign change pulse on line 70 is allowed to pass through counter 72 and turn off the signal on line 88 momentarily. This causes gate 84 to produce a signal momentarily which combines with the normally "on" signal on line 80 to produce an "off" signal on line 50. This "off" signal is fed back through line 82 to gate 84 so as to insure a continuous "on" condition in line 86 and a continuous "off" condition in gate 52. Thus, gates 38 and 40 receive an off or zero signal again exactly at the end of a laser gyroscope rotation cycle and the count displayed at reversible counter 42 is just that resulting from inertial rotation of the laser gyroscope. Since there are many variations in the type of trigger circuits, gate circuits, counter circuits and flip-flops used, we intend that our invention not be limited to the specific embodiments shown but only to the extent it is limited by the appended claims.

We claim:

1. Apparatus to separate the output signal of a laser angular rate sensor produced by an oscillating biasing rotation from the output signal produced by inertial rotation of the sensor comprising:
    a laser angular rate sensor operable to produce first output pulses indicative in number of the amount of rotation of the sensor in a first direction and operable to produce second output pulses indicative in number of the amount of rotation of the sensor in the opposite direction;
    biasing means for oscillating said sensor through a fixed angle of rotation; and
    reversible counting means connected to said sensor for counting in one direction said first pulses and in the reverse direction said second pulses; and control means connected to said counting means for electronically starting and stopping said counting means at turning points of the bias cycle so that said first and second pulses are counted during a predetermined integral number of cycles of back and forth bias rotation.

2. The apparatus of claim 1 in which said control means includes a sign change detecting means connected to said sensor operable to detect and indicate the point in time at which one of said first and second output pulses stops and the other of said first and second output pulses begins reset counting means connected to said sign change detecting means operable to detect and indicate a predetermined number of sign changes, and counting controlling means connected to said sign change detecting means operable to activate said counting means at said point in time and also connected to said reset counting means and operable to deactivate said counting means upon completion of said predetermined number of sign changes.

3. The apparatus of claim 2 in which said sign change detecting means comprises a first NAND gate connected to receive said first output pulses, a second NAND gate connected to receive said second output pulses, and a flip-flop circuit connected to said first and second NAND gates so as to close said first NAND gate and open said second NAND gate upon receiving a signal from said first NAND gate and further operable to close said second NAND gate and open said first NAND gate upon receiving a signal from said second NAND gate.

4. The apparatus as defined in claim 2 wherein said reset counting means comprises a bias cycle counter operable to receive sign change indications from said sign change detecting means, to register the number of half cycles of bias rotation, and provide a reset pulse after a predetermined number of half cycles are registered.

5. The apparatus as defined in claim 4 wherein said counting controlling means includes an electronic latch which is connected to receive the reset pulse from the bias cycle counter, and to deactivate said counting means upon receipt of the reset pulse.

\* \* \* \* \*